United States Patent [19]

Garbe

[11] Patent Number: 5,030,701
[45] Date of Patent: Jul. 9, 1991

[54] FLUORINE- AND CHROMOPHORE-CONTAINING POLYMER

[75] Inventor: James E. Garbe, Inver Grove Heights, Minn.

[73] Assignee: Minnesota Mining and Manufacturing Company, St. Paul, Minn.

[21] Appl. No.: 461,545

[22] Filed: Jan. 5, 1990

Related U.S. Application Data

[62] Division of Ser. No. 140,023, Dec. 31, 1987, Pat. No. 4,909,806.

[51] Int. Cl.$^5$ ............................................. C08F 18/20
[52] U.S. Cl. .................................. 526/245; 525/326.2
[58] Field of Search .................... 526/245; 525/326.2

[56] References Cited

U.S. PATENT DOCUMENTS

| | | | |
|---|---|---|---|
| 2,371,052 | 3/1945 | Kirby | 18/54 |
| 2,642,416 | 6/1953 | Ahlbrecht et al. | 526/245 |
| 3,250,807 | 5/1966 | Fritz . | |
| 3,281,426 | 10/1966 | Tiers | 260/314.5 |
| 3,503,087 | 3/1970 | Wolf | 8/164 |
| 3,567,678 | 3/1971 | Kalopissis | 260/41 |
| 3,933,914 | 1/1976 | Coles et al. | 26-/577 |
| 4,107,290 | 8/1978 | Jacquet et al. | 424/47 |
| 4,144,252 | 3/1979 | Wang et al. | 526/310 |
| 4,153,804 | 5/1979 | Yamabe et al. | 560/183 |
| 4,544,738 | 10/1985 | Baumann | 534/617 |
| 4,548,613 | 10/1985 | Bode et al. | 8/638 |
| 4,560,744 | 12/1985 | Baumann | 534/696 |
| 4,582,509 | 4/1986 | Buhler | 8/532 |
| 4,585,460 | 4/1986 | Schwander | 8/549 |
| 4,638,040 | 1/1987 | Hammar | 526/245 |
| 4,680,375 | 7/1987 | Elmasry | 528/253 |
| 4,909,806 | 3/1990 | Garbe | 526/245 |

FOREIGN PATENT DOCUMENTS

| | | | |
|---|---|---|---|
| 722530 | 11/1965 | Canada . | |
| 0323060 | 7/1989 | European Pat. Off. | 526/245 |
| 1036700 | 7/1966 | United Kingdom . | |
| 1188815 | 4/1970 | United Kingdom | 526/245 |

OTHER PUBLICATIONS

Hackh's Chemical Dictionary, p. 157.
Asquith, R. S., Blair, H. S., Crangle, A. A., Riordan, E., "Self-Coloured Polymer's Based on Anthraquinone Residues", *Journal of The Society of Dyers & Colourists*, Apr. 1977, pp. 114-125.
D. W. Bannister, A. D. Olin, H. A. Stinge, "Dyes and Dye Intermediates", *Kirk-Othmer Encyclopedia of Chemical Technology*, 3 ed., 8, (1979), pp. 159-212.
MIL STD-883C, Notice 5, Method 1014.8, "Seal", May 29, 1987.
MIL STD-750A, Method 1071, "Hermetic Seal", Aug. 26, 1968.
Yoshimoto et al., *Bulletin of the Chemistry Society of Japan*, 358, (1973).
Dawson, D. J., "Polymeric Dyes", Aldrichimica Acta, vol. 14, No. 2 (1981), pp. 23-29.
Hun Chung, R., Farris, R. E., "Dyes Anthraquinone", *Kirk-Othmer Encyclopedia of Chemical Technology*, 3rd ed. 8, (1979), pp. 213-279.
Marechal, Ernest, "Polymeric Dyes-Synthesis, Properties and Uses", *Progress in Organic Coatings*, 10 (1982), pp. 251-287.
"Synthetic Methods: Radical Attack on Macromolecules", H. A. J. Battaert and G. W. Tregear, *Graft Copolymers*, 1967, pp. 17-116.

Primary Examiner—Joseph L. Schofer
Assistant Examiner—N. Sarofim
Attorney, Agent, or Firm—Gary L. Griswold; Walter N. Kirn; Eloise J. Maki

[57] ABSTRACT

Chromophoric-moiety-containing, polymeric materials, containing at least one fluoroaliphatic radical, which are useful as dyes or colorants for fluorine-containing liquids, as coatings or components of coatings which are colored, light-absorbing, or fluorescing and characteristic properties of flurocarbon polymers, e.g. chemical inertness and hydrophobicity; and a method of detecting leaks in normally sealed devices, e.g. electronic devices, using a coating which includes the polymeric material, and a bath of fluorine-containing liquid in which the coating is soluble.

3 Claims, No Drawings

FLUORINE- AND CHROMOPHORE-CONTAINING POLYMER

This is a division of application Ser. No. 140,023 filed Dec. 31, 1987, now U.S. Pat. No. 4,909,806.

This invention relates to fluorine-containing polymers. In another aspect, it relates to the method of preparing such polymers. In a further aspect it relates to a method of dyeing fluorine-containing liquids. In still a further aspect, it relates to a method of making selectively soluble or chemically inert coatings of fluorine-containing polymers. In still a further aspect, it relates to a method of detecting leaks in normally sealed, fluid-containing devices such as electronic devices Self-colored, polymeric compounds have been described in the art. In Asquith et al., *Self-Coloured Polymers Based on Anthraquinone Residues*, Journal of the Society of Dyers and Colourists, April 1977, 114, the author classifies these compounds into categories according to their method of synthesis. The categories include polymers formed by modification of an already synthesized polymer, polymers formed by addition polymerization of dye monomers through olefinic links in which subsequent polymers are generally straight chain or crosslinked structures with chromophore-containing, side-chain groupings, and condensation polymerization usually based on a polyamide or polyester structure in which the chromophore-containing monomer acts as the polyfunctional acid, base, or alcohol. The condensation polymers generally contain the chromophore as an integral part of the main chain.

U.S. Pat. No. 4,619,990 (Elmasry) describes a number of polymeric dyes known in the art and their uses, including dyes with polymeric backbones of polyester, polyurethane, polyamide, and vinyl polymers with pendent phthalocyanine chromophores, and polymeric dyes derived from acrylate or methacrylate monomers with pendent azo, anthraquinone, or triarylmethane dye moieties. Disclosed in Elmasry are thermoplastic, polymeric dyes derived from condensation polymerization or copolymerization of ethylenically unsaturated monomers, with pendent chromphore groups selected from azo, tricyanovinyl, anthraquinone, methine, and indoaniline groups. Various other polymeric dyes are disclosed in the art, see U.K. Pat. No. 1,036,700 (Tadao) homopolymeric pigments containing anthraquinone groups polymerized through ethylenically unsaturated olefinic, e.g. acrylate, linkages, U.S. Pat. No. 3,567,678 (Kalopissis) water soluble polymer with an acrylate or methylacrlate backbone, U.S. Pat. No. 3,503,087 (Wolf) water-soluble copolymers consisting of ethylenically unsaturated azo or anthraquinone dye monomers and a water-soluble monomers, U.S. Pat. No..2,371,052 (Kirby) azo polymeric dyes that are condensation products, where said condensation product is dispersed in a cellulose derivative and treated with a diazonium compound to produce an azo dye in the cellulosic material.

The art also teaches the preparation of non-polymeric dyes with fluorine-containing substituents. U.S. Pat. No. 3,281,426 (Tiers) discloses a process of perfluoroalkylating aromatic compounds whereby one or more perfluoroalkyl chains become attached to an aromatic nucleus. Said process produces compounds which are soluble in some fluorinated solvents forming strongly blue solutions. U.S. Pat. No. 3,933,914 (Coles) discloses non-polymeric, organic dyes having fluoroaliphatic substituents. U.S. Pat. No. 4,585,460 (Schwander) discloses a bis-vinyl or substituted ethyl sulphenyl azo reactive dye. The dye may have substituents on its aromatic nucleus such as fluorine, or a $C_1$–$C_4$ alkyl or alkoxy straight chain or branched radical which may be further substituted by halogen, and alkyl or alkyoxy straight chain or branched groups which may be further substituted with fluorine. The dye also has a radical of a coupling component, attached through an azo group, which may have substituents as given above. There have also been a number of disclosures of non-polymeric dyes with F or $CF_3$ substituents, see U.S. Pat. No. 4,544,738 (Baumann), U.S. Pat. No. 4,548,613 (Bode), U.S. Pat. No. 4,560,744 (Baumann), U.S. Pat. No. 4,582,509 (Buhler).

This invention provides a new class of normally solid, fluorine-containing polymers which are inherently colored, light absorbing, or fluorescing and are preferably insoluble, at 20° C., in water and common, non-fluorinated, organic solvents, e.g. toluene and acetone, and generally soluble, at 20° C., in fluorinated liquids, e.g. 1,1,2-trichloro-2,2,1-trifluoroethane sold as Freon ® 113 or perfluorochemical liquids or mixtures of such liquids like perfluoroalkanes, e.g. perfluorooctane; perfluorotrialkylamines, e.g. perfluorotributylamine; perfluorodialkylether, e.g. perfluorodibutylether. Many of such liquids are commercially available such as Fluorinert ® Electronic Fluids from 3M Company, Freon ® E Series from DuPont De Nemours and Co., Flutec PP Series from ISC, Ltd., and Galden TM Perfluorinated Fluid from Montedison S.P.A..

One class of the polymers of this invention are colored, light-absorbing, or fluorescing polymers which contain fluorine in the form of fluoroaliphatic radicals and comprise interpolymerized repeating units derived from: (A) partially- or non-fluorinated,. non-chromophoric-moiety-containing monomer(s) and (B) partially- or non-fluorinated chromophoric-moiety-containing co-monomer(s), at least one of monomers (A) and (B) containing said fluoroaliphatic radicals. Said chromophoric moiety is a group of atoms that absorbs actinic radiation, such as visible light and ultra-violet radiation, and provides a colored, fluorescing or light absorbing molecule. The monomers (A) and (B) can be co-polymerized through chain-growth (i.e. addition) or step-growth (e.g. condensation) reactions, but a preferred class of polymers are made by chain-growth polymerizations. Step-growth monomers contain at least one, but preferably two, polymerizable groups such as hydroxyl, carboxyl, haloformic, isocyanato, and amino groups. Chain-growth monomers must have at least one, and preferably only one, ethylenically-unsaturated, polymerizable group such as acrylic, methacrylic, acrylamido, vinyl or allyl groups.

Another class of polymers of this invention are fluorine-containing, colored, light-absorbing or fluorescing, graft polymers which contain fluorine in the form of fluoroaliphatic radicals and are comprised of (1) a polymeric backbone comprising interpolymerized repeating units derived from partially- or non-fluorinated, non-chromophoric-moiety-containing monomer(s) containing at least one polymerizable group, e.g. vinyl, at least one of which monomer(s) contains a reactive group which can be selected from hydroxyl, carboxyl, haloformic, isocyanato, amino, acrylic, methacrylic, vinyl and allyl groups, and (2) at least one pendent group on the polymer backbone, which is derived from partially- or non-fluorinated, chromophoric-moiety-containing, pendent-group-precursor compounds containing at least one reactive group which can be selected from the same class described for said monomer(s) from which the polymeric backbone is derived. The reactive group(s) on the polymer backbone will react with selected reactive group(s) on the pendent-group-precursor compound(s) to form linkages such as carbamato, ester, amide and carbon-carbon linkages, but the reactive groups on the monomers from which the polymeric backbone is derived and the pendent-group-precursor compound(s) must not react with the polymerizable groups on the monomers from which the backbone is derived that react in the polymerization reaction which forms the backbone.

At least one monomer used in making the chain-growth and step-growth polymers, and at least one pendent group of the graft polymer or monomer making up the polymeric backbone of the graft polymer, contains a fluoroaliphatic radical, but preferably a plurality of fluoroaliphatic groups will be incorporated in the polymer and all or substantially all of the fluorine content of the polymer will reside in the plurality of fluoroaliphatic radicals incorporated into the polymer. The fluoroaliphatic radical is a fluorinated, stable, inert, non-polar, preferably saturated, monovalent or divalent moiety which is both oleophobic and hydrophobic. It can be straight chain, branched chain, and if sufficiently large, cyclic, or combinations thereof, such as alkylcycloaliphatic radicals. The skeletal chain can include catenary oxygen and/or trivalent nitrogen hetero atoms bonded only to carbon atoms, such hetero atoms providing stable linkages between fluorocarbon portions of the radical and not interfering with the inert character of the radical. The $R_f$ group can be a $CF_3$—group, but preferably it is larger and its terminal portion has at least three fully fluorinated carbon atoms, e.g., $CF_3CF_2CF_2$—, or $(CF_3)_2CF$—and the preferred compounds are those in which the $R_f$ group is fully or substantially completely fluorinated as in the case where $R_f$ is perfluoroalkyl, $C_nF_{2n+1}$. While the radical can have a large number of carbon atoms, generally the radical will have between 1 and 20 carbon atoms, and 4 to 10 carbon atoms are preferred. The radicals can contain about 40 to 83 weight percent, but preferably about 50 to 78 weight percent, fluorine.

In the interest of brevity, said monomer(s) (A), and co-monomer(s) (B) are respectively referred to, hereinafter on occasion as "non-dye monomers" and "dye monomers". The amount of dye and non-dye monomer(s) used to make the step-growth and chain-growth polymers, and the amounts of polymeric backbone and pendent groups comprising the graft polymer can vary depending on the intensity of color, light absorption or fluorescing properties desired in the polymer, but generally the non-dye monomer(s) or polymeric backbone is a major component of the polymer. Preferably, in the case of step-growth and chain-growth polymers, such polymers can be prepared by polymerizing 90 to 99.9 percent of non-dye monomer(s) with 10 to 0.1 percent of dye monomer(s) on the basis of total monomer weight. In the case of graft polymers, such polymers can be prepared by reacting 90 to 99.9 percent of polymeric backbone, via its reactive groups, with 10 to 0.1 percent pendent-group-precursor compound(s) on the basis of total backbone and pendent group weight.

Some of the polymers of this invention are useful as colored, light absorbing or fluorescing additives or colorants to impart color, light absorbing or fluorescing properties to fluorine-containing, normally colorless liquid such as perfluorochemical liquids or mixtures of such liquids. Dissolving the polymer in the liquid imparts color, or changes the light absorbing or fluorescing properties, of said fluorinated liquids, aiding in visually distinguishing one liquid from another. Generally, these polymers will be more soluble in the liquid if all or substantially all of their fluorine content resides in fluoroaliphatic radicals incorporated into the polymer and if the polarity of the polymer is similar to that of the liquids into which it is dissolved. Preferably, the fluorine content of the polymer will be about 40 to 70% based on total polymer weight. The polymers can also aid detection of leaks of fluorinated liquids from normally sealed devices, used for the purpose of heat transfer. Where used in the detection of leaks in heating and cooling equipment, a solution of the polymer in the fluorine-containing, heat transfer liquid is substituted for normally colorless, heat-transfer liquid, thereby making detection of the leaking liquid easier. The polymers can enhance detection of leaks into normally sealed systems, such as semiconductors, or other hermetically sealed electronic devices, using procedures like those described in MIL-STD-883C, Method 1014.8 or MIL-STD-750A, Method 1071. Where used in the detection of leaks in normally sealed systems, the polymer can be dissolved in one of the fluorochemical liquids specified in MIL-STD-883C, Method 1014,8, "Fluorocarbon Gross Leak Test", or MIL-STD-750A, Method 1071, "Fluorocarbon Gross Leak Test", and the procedure is carried out according to the steps specified. The polymer imparts color to or changes the light absorption or fluorescing properties of the bath described in such procedure, making bubbles escaping from the device into the bath easier to detect.

This invention also provides a new method of electronic device leak testing, in which some portion of the surfaces of the internal cavity of a normally sealed device are coated with a film containing at least one of the chromophore-containing polymers and said coating is soluble in a fluorine-containing liquid or mixture of liquids such as those described above. Preferably, the coating is comprised of a film-forming chromophoric-moiety-containing polymer. However, it can be comprised of a mixture of one or more chromophoric-moiety-containing polymer(s) and one or more, non-chromophoric-moiety-containing, film-forming polymers which are compatible; that is, the polymer must remain intimately mixed with the other polymer(s) comprising the mixture without macrophase separation when the mixture is in the solid state. The compatibility of a mixture of polymers is generally determined by trial and error, however, polar polymers, i.e. those containing a plurality of polar moieties such as oxygen atoms, will be more compatible with other polar polymers, e.g. polyester. Non-polar polymers, e.g. those which are predominantly hydrocarbon, will generally be more compatible with other non-polar polymers, e.g. vinyl polymers. Where the coating is comprised of a mixture of polymers, the amounts of each polymer in the mixture can vary widely depending upon the color-imparting or tinctorial strength of the chromophoric-moiety-containing polymer(s), the color, light absorption or fluorescing properties of the coating required, and any effect the chromophoric-moiety-containing polymer(s) may have on reducing the film forming properties of the mixture. In general, the major component of the mixture would be comprised of non-chromophoric-moiety-containing polymer(s), and preferably, chromophoricmoiety-containing polymer(s) can be present at levels of about 0.1–20% based on total mixture weight. The coating can be applied to the surfaces of the normally sealed device from solvent solution by known methods such as spraying, brushing, wire coating, knife coating, curtain coating or gravure coating. The device can then be immersed in a colorless liquid bath comprised of fluorine-containing liquid or a mixture of such liquids, the bath and device may be subjected to the pressurization step described in the fluorocarbon gross leak tests cited above, and the bath is monitored for a change in color, light absorption properties or fluorescing properties caused by the coating dissolving in the liquid that has leaked into the devices' internal cavity, and the subsequent migration of the dissolved, chromophoric-moiety-containing polymer from the internal cavity back into the bath. A change in the bath color, light absorption or fluorescing properties indicates a defective device.

Some of the polymers of this invention are also useful as colored, light absorbing or fluorescing coatings or components of such coatings, that provide the characteristic properties of fluoropolymer coatings, e.g. chemical inertness, electrical non-conductivity, hydrophobicity, oleophobicity, and repellency to silicone oils. Preferably, the coatings are comprised of a film-forming, chromophoric-moiety-containing polymer, however, the coatings may be comprised of a mixture of one or more chromophoric-moiety-containing polymer(s) and one or more compatible, film-forming, non-chromophoric-moiety-containing polymer(s). Where the coating is comprised of a mixture of polymers, the amounts of each polymer in the mixture can vary widely depending upon the desired coating color, fluorescing or light absorption properties, the film-forming properties of the mixture of polymers comprising the coating, and other desired coating physical properties, e.g. chemical inertness. In general, the major component of the mixture is comprised of non-chromophoric-moiety-containing polymer(s). Preferably, the chromophoric-moiety-containing polymer or polymers can be present at levels of about 0.1–20% based on total mixture weight, and the fluorine content of the coating should be at least about 30%. Some examples of such coatings are UV-absorbing, protective coatings for billboards, oil repellent, fluorescing, antimigration coatings for the inside of oil-filled devices, e.g. rocket gyroscopes, to prevent oil leakage from the device and allow visual inspection of the coated surface to ensure it is covered with the coating, electrically non-conducting, chemically inert, protective, copolymer coatings for electronic devices like circuit boards, release coatings, and selectively soluble coatings used as selectively soluble photo resists for imaging systems and electronic chip etching.

The invention permits the adjustment of color, color intensity, and light absorbing or fluorescing properties of the polymer by controlling the selection and amount of the polymerizable dye monomer(s), or pendent-group-precursor compound(s) incorporated in the polymer. The use of the polymers of this invention as a photo resist in the production of electronic chips offers advantages over currently used photo resists, for example, the non-wetting character of coatings made from the polymers may provide sharper, clearer painted patterns on the chip substrate, and the solvents used to wash the coating off the chip substrate are generally less toxic and less flammable than currently used solvents.

Some of the polymers of this invention can be made by step-growth or chain-growth polymerization reactions, others by graft polymerization, but a preferred class of polymers are made by chain-growth reactions. Step-growth polymers can be derived from mono- or di-functional, or mixtures of mono- and di-functional, non-dye monomer(s), and mono- or di-functional, or mixtures of mono- and di-functional, dye monomer(s). Mono- and di-functional monomers have, respectively, one or two polymerizable groups, that can be selected from hydroxyl, carboxyl, haloformic, isocyanato, or amino groups. Preferably, dye and non-dye monomer(s) are difunctional and the polymerizable groups on all dye monomer(s) are capable of polymerizing through step-growth polymerization reactions with the polymerizable groups on all non-dye monomers. Examples of step-growth polymers are polymers derived from non-dye monomer(s) selected from diacid, dihaloformate, diisocyanate, and diacid halide non-dye monomers, and dye monomer(s) selected from diol and diamino monomers. An example of a graft polymer is one in which the polymeric backbone is derived from monomers with polymerizable acrylic groups, and at least one of the monomers incorporated in the backbone has a reactive group, e.g. hydroxyl, which will not participate in the polymerization reaction, but will react with the reactive group on the pendent-group-precursor compound, e.g. isocyanato. The pendent-group-precursor compound must not contain any group, including its reactive group, that will react with the polymerizable groups on the monomer(s) comprising the polymeric backbone. Chain-growth polymers may be derived from dye and non-dye monomer(s) with ethylenically unsaturated, polymerizable groups, such as acrylic, methacrylic, acrylamido, vinyl, or allyl. Said groups on dye and non-dye monomer(s) need not be identical, and said monomer(s) can have one or more ethylenically unsaturated polymerizable group(s) which need not be identical. However preferably, each monomer will have only one polymerizable group. Some chain-growth polymers will be comprised of interpolymerized units having the general formulas I and II given below:

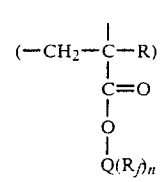

(I)

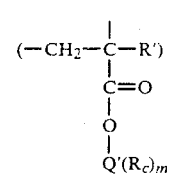

(II)

Wherein R and R' are H or CH$_3$, and Q and Q' are linking groups. Q' can be a valence bond, for example, where a carbon atom of the chromophoric-moiety is bonded or linked directly to the oxygen moiety. Q can also be a valence bond as long as the fluoroaliphatic radical is bonded to the oxygen moiety through a —CHR" group where R" is H or alkyl. Q and Q' each can also comprise one or more linking groups such as polyvalent aliphatic moieties, e.g. —CH₂CH₂—and —CH₂CH(CH₂—)₂, polyvalent aromatic moieties,

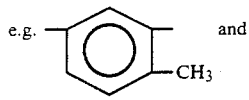

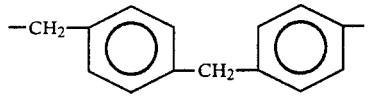

oxy, thio, carboxyl, sulfone, sulfoxy, phosphoxy, —P-(O)OH—, amine, e.g. —NH— and —N(C₂H₅)—, or combinations thereof, such as oxyalkylene, iminoalkylene, iminoarylene, sulfonamido, carbonamido, sulfonamido alkylene, carbonamido alkylene, carbamato. $R_f$ is a fluoroaliphatic group, n is 1. All type I units incorporated in the polymer need not have the same R, R" or $R_f$ groups. $R_c$ is an organic radical containing a chromophoric moiety and m is a number greater than or equal to 1. All type II units in the polymer need not have the same $R_c$ or R' groups, but preferably, all $R_c$ groups will be the same and m will be equal to 1. Type I and II units may be randomly distributed in the polymer. A preferred class of polymers derived from monomers yielding interpolymerized units having general formulas (I) and (II) can be prepared by the chain-growth polymerization of highly fluorinated acrylates and non- or partially-fluorinated, dye acrylates or acrylamides, and optionally, small amounts of other non-dye monomers, such as alkyl acrylates, acrylic acid, vinyl chloride, vinylidene chloride and the like. The molar ratio of dye to non-dye monomer(s) can depend on the intensity of light absorption desired in the final polymer, and on the solubility of the monomers in the reaction solvents (e.g Freon® 113, 2,3,3-trichloroheptafluorobutane, or combinations of these solvents with non-fluorinated solvents such as ethyl acetate).

Dye monomers and pendent groups used in the invention can be inherently light-absorbing, colored, fluorescent or UV-absorbing and may be partially- or non-fluorinated. Said monomers and pendent groups must have one or more chromophoric moieties of the same or different type, but preferably, only one chromophoric moiety is contained in each monomer or pendent group. Said chromophoric moieties can be selected from the following types as described in D. W. Bannister, A. D. Olin, H. A. Stinge, "Dyes and Dye Intermediates", *Kirk-Othmer Encyclopedia of Chemical Technology* 3rd Ed., 8, 159–212 (1979):

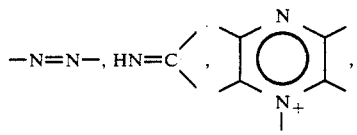

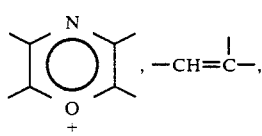

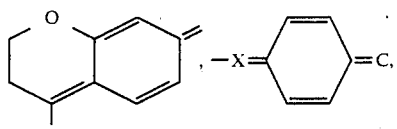

where X is O or N,

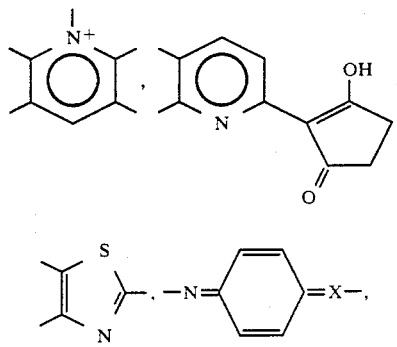

where X is O or N, moieties with C=N—OH ortho to C=O,

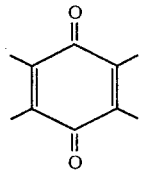

moieties containing an aromatic ring with a nitro group ortho or para to an amino, hydroxyl or ether group,

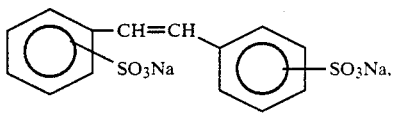

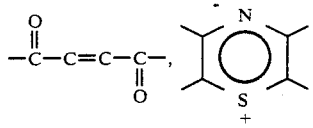

moieties containing a tetrabenzoporphyrazine group, moieties with a C=C—OH group and a C=C—C=O group,

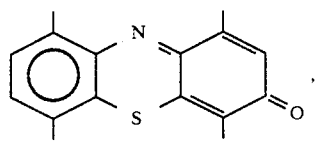

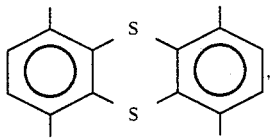

-continued

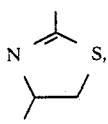

and moieties with both

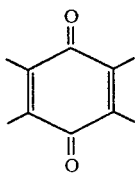

group and

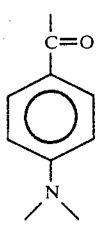

group.

The selection of chromophoric moiety or moieties can determine the color or light absorbing or fluorescing properties of the polymer. The dye monomer(s) for step-growth polymers may be mono- or di-functional, with polymerizable groups that will react with polymerizable groups on at least one of the non-dye monomer(s) or other dye monomer(s), where mixtures of dye monomers are used to derive the polymer, to form linkages through step-growth polymerization reactions. Preferably, said dye monomer(s) will be difunctional and said polymerizable groups will be identical, e.g. dihydroxyl or dicarboxyl. The dye monomer(s) for chain-growth polymers must have at least one ethylenically unsaturated, polymerizable group, and only one such group is preferred, but they may have more than one ethylenically unsaturated group and said groups need not be identical. Said groups can polymerize with ethylenically unsaturated groups on non-dye monomer(s) or dye monomer(s) to form linkages between said monomers through chain-growth polymerization reactions. Preferably, all polymerizable groups on dye monomer(s) will be terminal groups. The pendent-group-precursor compound used to prepare graft polymers will have at least one reactive group chosen, for example, from hydroxyl, carboxyl, haloformic, isocyanato, amino, acrylic, methacrylic, acrylamido, vinyl, or allyl, and this group will not react with polymerizable groups on the non-dye monomers making up the polymeric backbone.

Commercially available dyes like Disperse Red 17 (color index No. 11210), a diol, available from Crompton and Knowles Corporation, can be used as a dye monomer in step-growth polymerization reactions. A preferred class of dye monomers used in chain-growth polymerization reactions can be prepared from dyes containing hydroxy or amino groups, be reaction with acrylic or methacrylic acid chlorides via the reaction

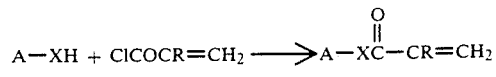

Where A is a chromophore-containing group, such as AR—N=N—Ar—, Ar is a substituted or unsubstituted aryl (e.g. phenyl, naphthyl, etc.), X is O or NH, and R is H or $CH_3$. The following is a list of representative dye monomers useful in this invention:

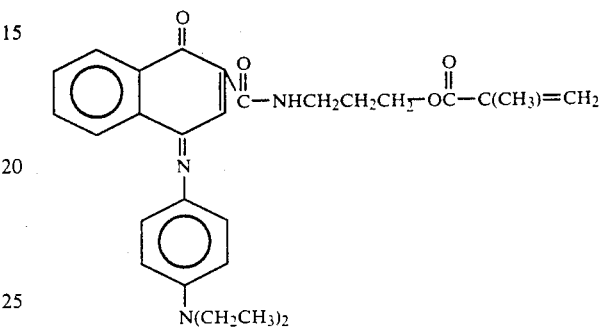

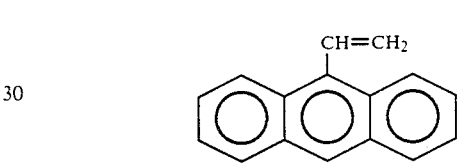

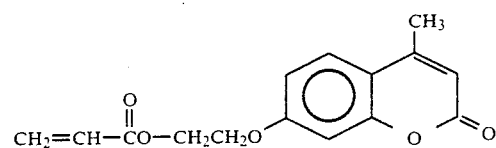

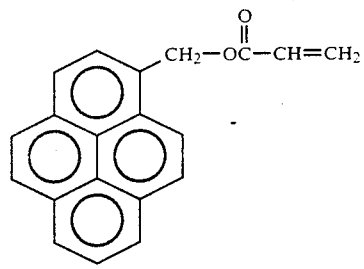

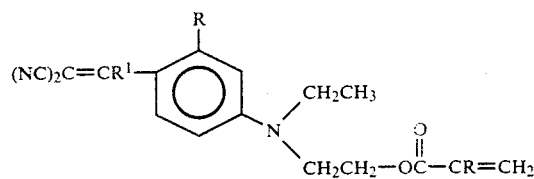

where R is H or $CH_3$, and $R^1$ is H or CN.

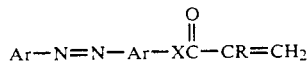

where X is O or NH, Ar is a substituted or unsubstituted aryl (e.g. phenyl, napthyl, etc.), and R is H or $CH_3$.

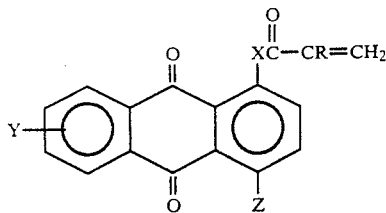

where Y and Z, which may be the same or different, are selected from —NO$_2$, —OR''', —NHR''', alkyl, aryl, and R''' is aryl or C$_1$ to C$_8$ alkyl, X is O or NH, and R is H or CH$_3$.

Non-dye monomer(s) used in chain-growth and step-growth polymers as well as the polymeric backbone of graft polymers can be partially-, or non-fluorinated, but preferably, non-dye monomer(s) are fluorinated and contain fluoroaliphatic groups. In step-growth polymers, the non-dye monomer(s) can be mono- or di-functional and the polymerizable groups can react with polymerizable groups on dye or other non-dye monomer(s), where mixtures of non-dye monomers are used to derive the polymer, to form linkages through step-growth polymerization reactions. Preferably said monomer(s) are di-functional, and their polymerizaole groups are identical. In chain-growth polymers, the non-dye monomer(s) can have one or more ethylenically unsaturated groups, but preferably only one, which can react with ethylenically unsaturated groups on other non-dye or dye monomer(s) to form linkages between monomers through chain-growth polymerization reactions. If a monomer has more than one ethylenically unsaturated group, the groups need not be identical and the groups on other non-dye monomer(s) need not be identical. Non-dye monomers used to make the polymeric back bone in graft polymers are similar to those used in either step-growth or chain-growth polymers, but at least one of the monomer units comprising said backbone, must contain a reactive group, e.g. hydroxyl, carboxyl, haloformic, isocyanato, amino, acrylic, methacrylic, acrylamido, vinyl and allyl, that will react with the reactive group on the pendent-group-precursor compound(s) to form a linkage, and will not participate in the polymerization reaction used to make the polymeric backbone. Preferably, all polymerizable groups on non-dye monomer(s) will be terminal groups. A preferred class of non-dye monomers are fluorochemical acrylates which can be prepared by the condensation of suitable fluorochemical alcohols, amines or acrylamides with acrylic or methacrylic acid chlorides via the following reaction:

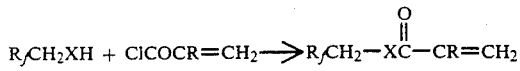

Where R$_f$ is a fluoroaliphatic group, X is O or NH, and R is H or CH$_3$. The following is a representative list of fluorochemical acrylates useful in this invention:

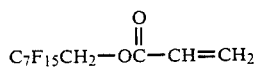

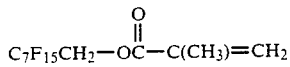

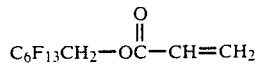

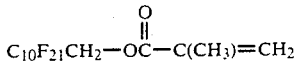

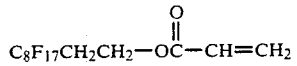

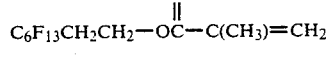

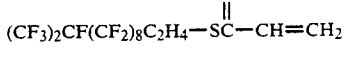

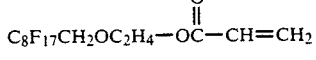

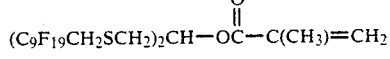

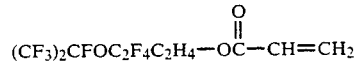

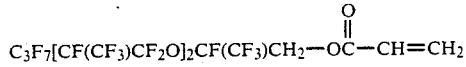

Further description of the preparation of graft, step-growth and chain-growth polymers will be omitted in the interest of brevity since in most cases they follow classical methods such as described, for example, in W. R. Sorenson and T. W. Campbell, *Preparative Methods of Polymer Chemistry* 57-234 (1961), and H. A. J. Battaerd and G. W. Treyear, *Graft Copolymers* (1967).

The following specific but nonlimiting examples will serve to illustrate the present invention.

EXAMPLE 1

1-acryloxy-4-(p-tolylamino)anthraquinone, an acrylate dye monomer, was prepared by dissolving 2.0 g (0.0061 mole) of 1-hydroxy-4-(p-tolyamino)anthraquinone in 100 mL of chloroform. Said solution was heated to reflux and treated with 0.85 mL (0.61 g) of triethylamine. To this solution was added 0.49 mL (0.0061 mole) of acryloyl chloride dropwise over 15 minutes. The reaction was monitored by thin layer chromatography. After 3 hours, some product had appeared, and the reaction mixture was treated with additional triethylamine and acryloyl chloride. After a total of 6 hours, thin layer chromatography showed some remaining starting material. The mixture was cooled, washed with water and dried over sodium sulfate. After solvent removal, a blue-violet solid remained which was purified by column chromatography, using silica gel and chloroform, to give the pure acrylate with a melting point of 164.5–166° C. The product was recrystallized from hexane as fine, blue-violet needles which gave a red solution when dissolved in organic solvents like chloroform.

A copolymer of

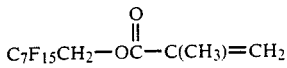

(prepared by reacting methacrylol chloride with 1,1-dihydroperfluorooctanol according to the method described in U.S. Pat. No. 2,642,416) and 1-acryloxy-4-(p-tolyamino)anthraquinone was prepared by dissolving 10 g of the fluorochemical methacrylate, 0.862 g of the anthraquinone acrylate and 0.06 g of azobis(isobulyronitrile) (i.e. AIBN) in 60 g of 2,3,3-trichloroheptafluorobutane. The reactants were mixed in a 115 mL glass bottle then degassed by successive evacuations by an aspirator followed by flushing the bottle with nitrogen gas. After degassing, nitrogen gas was bubbled through the solution for 10 minutes. The bottle was then tightly sealed with a screw cap and placed in a Launder-O-Meter TM with the water bath set at 65° C. The reaction bottle was agitated in the water bath for 16 hours after which it was cooled and opened. The polymeric product, which formed a red solution, was filtered and the solvent was removed under reduced pressure. The solid, polymer product was soluble in Freon ® 113, Fluorinert ® liquid, FC-75, and was insoluble in and did not impart color to toluene or acetone which means that the product contained no free dye monomer, nor did it contain any homopolymer of the dye monomer since these would both be soluble in and would impart color to acetone or toluene.

EXAMPLES 2-9

Examples 2-9 were prepared according to procedure of Example 1; however, different dye monomers, quantities of dye monomers, non-dye monomers, AIBN, Freon ® 113, and in some cases, various quantities of a co-solvent, ethyl acetate were used. The dye monomer and quantities of each reactant used are summarized in Table 1.

TABLE-1

| Example | Monomer structure (color) | Dye monomer (g) | Non-dye monomer (g) | AIBN (g) | Freon ® 113 (g) | Ethyl acetate (g) |
|---|---|---|---|---|---|---|
| 2 | 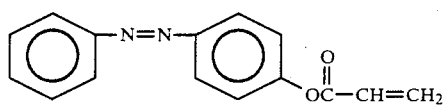<br>(yellow-orange) | 0.2 | 20 | 0.12 | 120 | 0 |
| 3 | " | 1.0 | 20 | 0.12 | 120 | 0 |
| 4 | 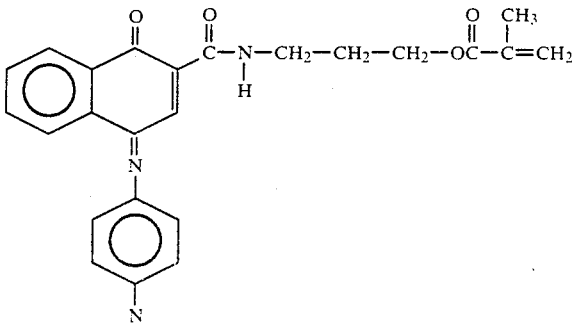<br>(cyan) | 0.0195 | 10 | 0.06 | 60 | 1 |
| 5 | " | 0.058 | 10 | 0.06 | 60 | 2.1 |
| 6 | 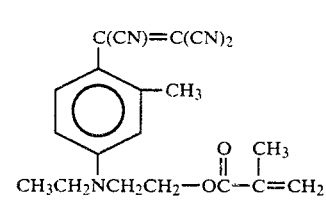<br>(magenta) | 0.02 | 10 | 0.06 | 60 | 1.5 |
| 7 | " | 0.0485 | 10 | 0.06 | 60 | 2.5 |
| 8 | 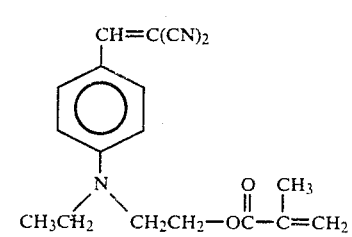<br>(yellow) | 0.0215 | 10 | 0.06 | 60 | 1 |

TABLE-1-continued

| Example | Monomer structure (color) | Dye monomer (g) | Non-dye monomer (g) | AIBN (g) | Freon ® 113 (g) | Ethyl acetate (g) |
|---|---|---|---|---|---|---|
| 9 | 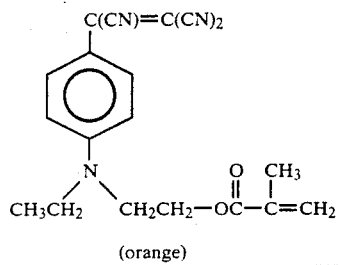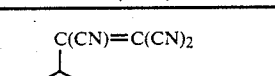 (orange) | 0.0215 | 10 | 0.06 | 60 | 1 |

EXAMPLE 10-12

Examples 10–12 were prepared according to the procedure of Example 1; however, different, novel, dye monomers (the preparation of which are described below), and different quantities of dye monomer, non-dye monomer, AIBN, and Freon ® 113 were used., and in some cases, various quantities of a co-solvent, ethyl acetate, was used. The dye monomer, and the quantities of each reactant used are summarized in Table 2.

The dye monomer used in Examples 10 and 11 was prepared by dissolving 3 g of 7-hydroxy-4-methyl-coumarin in a solution of 0.68 g sodium hydroxide and 30 mL of water. A 1.37 g quantity of 2-chloroethanol was added to the solution and the mixture was refluxed for 5 hours. The crude product, which precipitated when the mixture was cooled to room temperature, was isolated by suction filtration and recrystallized from ethanol as white crystals, with a melting point of 144–146° C. A solution was prepared by dissolving 1.5 g of the white, crystalline product and 1.38 g of triethylamine in 30 mL of chloroform. This solution was refluxed while 1.23 g of acryloyl chloride was added dropwise. The solution was then stirred and refluxed for 3 hours, and analysis by thin layer chromatography indicated complete reaction. The mixture was cooled to room temperature, and the solvent removed under vaccuum. The crude product was recrystallized from ethanol to yield 1.27 g of the product,

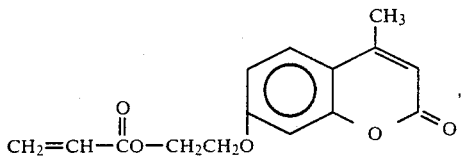

which had a melting point of 90–92° C., and a proton NMR spectrum consistent with the assigned structure.

The dye monomer used in Example 12 was prepared by dissolving 1 g of 3-pyrenemethanal (prepared according to the procedure of Yoshimoto, et al., 46 *Bulletin of the Chemistry Society of Japan* 358, (1973)) in 60 mL of chloroform, and adding 0.88 g of triethylamine to the solution followed by 0.78 g of acryloyl chloride. The solution was then refluxed for 6 hours. After the solvent was removed, a yellow solid remained. The yellow solid was recrystallized from petroleum ether to yield 0.714 g of the white, crystalline, acrylate, product

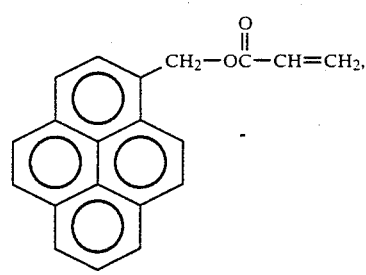

which had a melting point of 70–72° C. and a proton NMR spectrum consistent with the assigned structure.

TABLE-2

| Example | Monomer structure (color) | Dye monomer (g) | Non-dye monomer (g) | AIBN (g) | Freon ® 113 (g) | Ethyl acetate (g) |
|---|---|---|---|---|---|---|
| 10 | 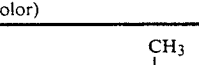 | .125 | 10 | .06 | 60 | 5 |
| 11 | " | .257 | 10 | .06 | 60 | 10 |

TABLE-2-continued

| Example | Monomer structure (color) | Dye monomer (g) | Non-dye monomer (g) | AIBN (g) | Freon ® 113 (g) | Ethyl acetate (g) |
| --- | --- | --- | --- | --- | --- | --- |
| 12 | 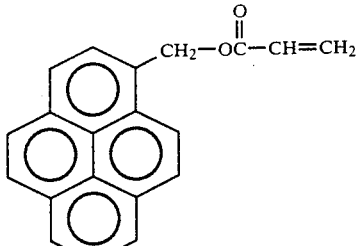 | .1 | 10 | .06 | 60 | 0 |

EXAMPLE 13

A fluorochemical, polycarbonate compound was prepared by a step-growth polymerization of a dye monomer and a bischloroformate monomer derived from a fluorochemical diol. The bischloroformate monomer, $ClCOOCH_2(CF_2)_3OCF(CF_3)CH_2OCOCl$, was prepared by reducing $FCO(CF_2)_3OCF(CF_3)COF$ (the 1:1 adduct of $FCOCF_2CF_2COF$ and

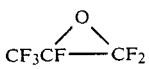

made by the method described in U.S. Pat. No. 3,250,807 (Fritz)) with sodium borohydride, yielding $HOCH_2(CF_2)_3OCF(CF_3)CH_2OH$. Some of the diol was then reacted with phosgene to form the bischloroformate monomer. The dye monomer was

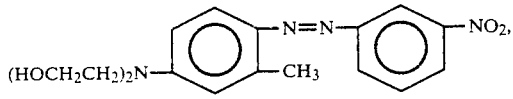

Disperse Red 17 (color index No. 11210), available from Crompton and Knowles Corporation. 3.09 g of the bischloroformate monomer and 30 mL of tetrahydrdfuran were placed in a reaction flask containing a magnetic stirring bar. A solution of 0.78 g of the dye monomer and 0.48 g of triethylamine was prepared in 15 mL of tetrahydrofuran and added dropwise to the stirred solution of the bischloroformate monomer. A fine solid of triethylamine hydrochloride formed during the addition. To this reaction mixture, an additional 0.78 g of the bischloroformate monomer and 0.48 g of triethylamine were added. After the addition, the reaction mixture was washed with water to remove the triethylamine hydrochloride salt by-product. The structure of the polycarbonate product, which formed a red solution in the tetrahydrofuran reaction solvent, was confirmed by IR and H-NMR spectral analysis. The polymer, isolated by removal of solvent, was a viscous red liquid soluble in acetone and benzotrifluoride and slightly soluble in Freon ® 113. One crop of the above prepared polycarbonate dye was dissolved in 5 mL of a 30% by weight butyl acetate solution of a commercial fluorocarbon copolymer used as a conformal coating for electronic circuitry. The resulting polymer solution was coated on a clear plastic film using a #32 wire wound rod to give a solid orange coating upon evaporation of the solvent.

Various modifications and alterations of this invention will become apparent to these skilled in the art without departing from the scope of this invention.

What is claimed is:

1. A fluorine-containing, colored, fluorescing or light absorbing polymer having at least about 40 weight percent fluorine, wherein substantially all of the fluroine content of the polymer resides in fluoroaliphatic radicals incorporated into the polymer and said polymers are derived from:
   (A) a polymeric backbone of interpolymerized, repeating units derived from partially- or non-fluorinated, non-chromophoric-moiety-containing monomer(s), and
   (B) at least one partially- or non-fluroinated, chromophoric-moiety-containing pendent-group-precursor compound(s).

2. A polymer according to claim 1, wherein said polymer is derived from 90 to 99.9 weight percent polymeric backbone (A) and 10 to 0.1 weight percent pendent-group-precursor compound(s) (B).

3. A polymer according to claim 1, wherein said polymeric backbone (A) contains at least one reactive group selected from the group consisting of hydroxyl, carboxyl, haloformic, isocyanato, amino, acrylic, methacrylic, acrylamido, vinyl and allyl groups, and said pendent-group-precursor compound(s) (B) contain at least one reactive group selected from the group consisting of hydroxyl, carboxyl, haloformic, isocyanato, amino, acrylic, methacrylic, acrylamido, vinyl and allyl groups, and said reactive group on the polymeric backbone (A) reacts with said reactive group on the pendent-group-precursor compound(s) (B).

* * * * *

UNITED STATES PATENT AND TRADEMARK OFFICE
CERTIFICATE OF CORRECTION

PATENT NO. : 5,030,701
DATED : July 9, 1991
INVENTOR(S) : James E. Garbe

It is certified that error appears in the above-indentified patent and that said Letters Patent is hereby corrected as shown below:

Col. 1, line 15, "devices" should be --devices.--.

Col. 10, line 8, "AR" should be --Ar--.

Col. 13, line 6, "buly" should be --buty--.

Col. 17, line 44, "drd" should be --dro--.

Col. 18:
Claim 1, line 3, "fluroine" should be --fluorine--.

Claim 1, line 11, "non-fluroinated,"
  should be --non-fluorinated,--.

The formula in col. 9, lines 2-7 should be

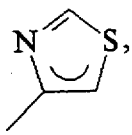

Signed and Sealed this

Eleventh Day of July, 1995

Attest:

BRUCE LEHMAN

Attesting Officer    Commissioner of Patents and Trademarks